United States Patent
Schmidt

(10) Patent No.: US 10,675,603 B2
(45) Date of Patent: Jun. 9, 2020

(54) DEVICE AND METHOD FOR PASTILLATING A FLOWABLE PRODUCT

(71) Applicant: SANDVIK MATERIALS TECHNOLOGY DEUTSCHLAND GMBH, Düsseldorf (DE)

(72) Inventor: Bernd Schmidt, Wendlingen (DE)

(73) Assignee: IPCO GERMANY GMBH, Fellbach (DE)

( * ) Notice: Subject to any disclaimer, the term of this patent is extended or adjusted under 35 U.S.C. 154(b) by 288 days.

(21) Appl. No.: 15/532,412

(22) PCT Filed: Nov. 25, 2015

(86) PCT No.: PCT/EP2015/077606
§ 371 (c)(1),
(2) Date: Jun. 1, 2017

(87) PCT Pub. No.: WO2016/087276
PCT Pub. Date: Jun. 9, 2016

(65) Prior Publication Data
US 2017/0326760 A1    Nov. 16, 2017

(30) Foreign Application Priority Data
Dec. 3, 2014 (DE) .................. 10 2014 224 736

(51) Int. Cl.
*B01J 2/26* (2006.01)
*B29B 9/10* (2006.01)
(Continued)

(52) U.S. Cl.
CPC .................. *B01J 2/26* (2013.01); *B29B 9/10* (2013.01); *B29C 33/58* (2013.01); *B29C 41/02* (2013.01);
(Continued)

(58) Field of Classification Search
CPC ....... G05F 11/006; G05F 11/008; G05F 11/03
See application file for complete search history.

(56) References Cited

U.S. PATENT DOCUMENTS 3,265,779 A    8/1966    Gobla et al.
5,286,175 A *  2/1994    Hammonds .......... B01F 15/0416
                                            366/136
(Continued)

FOREIGN PATENT DOCUMENTS

CN    202762400 U    3/2013
CN    202803200 U    3/2013
(Continued)

OTHER PUBLICATIONS

EPO Machine Translation of EP 0714054 A2, Jul. 23, 2019 (Year: 2019).*

(Continued)

*Primary Examiner* — Benjamin A Schiffman
(74) *Attorney, Agent, or Firm* — Flynn Thiel, P.C.

(57) ABSTRACT

A device for pastillating a flowable product, in particular a melt. The device has a revolving belt and a drop former, and the drop former deposits product drops on an upper run of the belt. The product drops, in the course of transportation on the upper run of the belt, solidify to form pastilles, and an arrangement for wetting the belt with a liquid release agent is provided upstream of that region in which the product drops are deposited on the belt. The release agent prevents or reduces the adhesion of the product drops to the belt, and a proportional metering pump is provided for continuously mixing the release agent from at least two liquid components during the operation of the device.

20 Claims, 2 Drawing Sheets

(51) Int. Cl.
   *G05D 11/03*     (2006.01)
   *G05D 11/00*     (2006.01)
   *B29C 33/58*     (2006.01)
   *B29C 41/02*     (2006.01)
   *B29C 41/38*     (2006.01)
   *B29C 41/42*     (2006.01)
   *B29C 41/52*     (2006.01)

(52) U.S. Cl.
   CPC .............. *B29C 41/38* (2013.01); *B29C 41/42* (2013.01); *B29C 41/52* (2013.01); *G05D 11/006* (2013.01); *G05D 11/008* (2013.01); *G05D 11/03* (2013.01)

(56) References Cited

U.S. PATENT DOCUMENTS

| | | | |
|---|---|---|---|
| 9,366,485 | B2 | 6/2016 | Schromm et al. |
| 2005/0270899 | A1* | 12/2005 | Phallen .............. B01F 15/042 366/160.2 |
| 2007/0131381 | A1 | 6/2007 | Schermutzki et al. |
| 2013/0112370 | A1 | 5/2013 | Schromm et al. |

FOREIGN PATENT DOCUMENTS

| | | |
|---|---|---|
| DE | 2 034 038 | 2/1972 |
| DE | 31 24 200 A1 | 1/1983 |
| DE | 299 01 168 U1 | 6/1999 |
| DE | 10 2005 054 462 A1 | 5/2007 |
| DE | 10 2010 007 390 A1 | 8/2011 |
| DE | 10 2010 032 021 A1 | 1/2012 |
| EP | 0 531 927 A1 | 3/1993 |
| EP | 0 714 054 A2 | 5/1996 |
| EP | 2 353 709 A1 | 8/2011 |
| GB | 1 345 811 | 2/1974 |
| KR | 10-0432287 B1 | 5/1998 |

OTHER PUBLICATIONS

Notification of Transmittal of International Search Report issued in Application No. PCT/EP2015/077606 dated Feb. 25, 2016 (1 page).
International Search Report issued in Application No. PCT/EP2015/077606 with English translation dated Feb. 25, 2016 (9 pages).
Written Opinion of International Searching Authority issued in Application No. PCT/EP2015/077606 dated Feb. 25, 2016 (6 pages).
Office Action of German Patent Office issued in Application No. 10 2014 224 736.5 dated Jul. 13, 2015 (5 pages).
Dosatron® Water Powered Dosing Technology Article, Dosatron International S.A.S. 2011. URL: http://www.ando-technik.de/pdf/dosatron/dosatron-dosierer.pdf[abgerufen am Jul. 10, 2015] (4 pages).
Chinese Office Action issued in Application No. 201580065605.1 dated Oct. 25, 2018 (5 pages).

* cited by examiner

DEVICE AND METHOD FOR PASTILLATING A FLOWABLE PRODUCT

TECHNICAL FIELD

The invention relates to a device for pastillating a flowable product, in particular a melt, said device having a revolving belt and a drop former, wherein the drop former deposits product drops on an upper run of the steel belt, wherein the product drops in the course of transportation on the upper run of the belt solidify to form pastilles, and wherein means for wetting the belt with a liquid release agent are provided upstream of that region in which the product drops are deposited on the belt, wherein the release agent prevents or reduces the adhesion of the product drops to the belt. The invention also relates to a method for pastillating a flowable product, wherein a liquid release agent is used between a belt and product drops that are deposited on the belt.

BACKGROUND

It is problematic in the mixing of a release agent for use between a belt and product drops that are deposited on the belt, for example product drops of a sulfuric melt, that the release agent at least partially decomposes again after some time. When a comparatively large quantity of a release agent is produced within a tank, the concentration of the release agent can thus vary over time. This could only be addressed in that the release agent is continually stirred or agitated, respectively. The correct concentration of the release agent in the case of such mixing in tanks depends exclusively on the diligence of the operator.

By way of the invention, a device and a method for pastillating a flowable product are to be improved in terms of the production of a release agent that is used between the belt and the product drops.

To this end, according to the invention, a device for pastillating a flowable product, in particular a melt, said device having a revolving belt and a drop former, is provided, wherein the drop former deposits product drops on an upper run of the steel belt, wherein the product drops in the course of transportation on the upper run of the belt solidify to form pastilles, and wherein means for wetting the belt with a liquid release agent are provided upstream of that region in which the product drops are deposited on the belt, wherein the release agent prevents or reduces the adhesion of the product drops to the belt, in which device a proportional metering pump is provided for continuously mixing the release agent from at least two liquid components during the operation of the device.

In that the release agent is continuously mixed during the operation of the device, the dwell time between the release agent being mixed and used is very minor. This offers the significant advantage that there is no risk of the components of the release agent separating again during the dwell time in a tank. In that a proportional metering pump is provided for continuously mixing the release agent it can also be ensured that the concentration or composition, respectively, of the release agent remains constant during the operation of the device. A desired composition or concentration, respectively, of the release agent herein can be set at the proportional metering pump. The composition or concentration, respectively, of the release agent is thus independent of the diligence of an operator. Since no tanks, or only small tanks, are required for intermediate storage, and in particular stirring installations are no longer required, the space and the investment required for the device for pastillating can be reduced.

In a refinement of the invention, an intermediate tank for intermediately storing the mixed release agent prior to the application to the belt is provided.

In a refinement of the invention, a holding capacity of the intermediate tank is smaller than a quantity of release agent that is required in four operating hours of the device.

The provision of a small intermediate tank which is in any case smaller than a quantity of release agent that is required in four operating hours of the device has proven advantageous. When the release agent is produced from water and from a release agent concentrate, for example, the concentrate container has to be changed from time to time. The intermediate tank then advantageously has a size which only bridges the period for changing the concentrate container. For example, the intermediate tank can also be dimensioned such that the proportional metering pump, filters, and the like can be serviced, for example cleaned, during the ongoing operation of the device for pastillating, since the release agent during the servicing period is retrieved from the intermediate tank.

In a refinement of the invention, the at least two components of the release agent in the mixed state form a dispersion.

The device according to the invention enables components of the release agent that are not mutually dissolvable and that can only be mixed to form a dispersion to be used. Since continuous mixing of the release agent is performed by the device according to the invention, there is no risk of the release agent decomposing again prior to wetting the revolving belt.

In a refinement of the invention, means for temperature controlling at least one component of the release agent are provided.

By providing means for temperature controlling, a temperature-dependent viscosity of the release agent, or of a component of the release agent, respectively, can be maintained within a desired range. On account thereof, maintaining an exact mixing ratio is significantly facilitated. Such means for temperature controlling are of great advantage in particular when mixing release agents for pastillating a sulfuric melt.

In a refinement of the invention, the proportional metering pump and a storage container for a component of the release agent are disposed in a common housing, wherein temperature control means for maintaining a temperature within the housing in a predefined range are provided.

By disposing the proportional metering pump and a storage container for a component of the release agent in a common housing, temperature controlling can be performed in a very simple and unproblematic manner by heating and/or cooling the housing interior. This is advantageous in particular in the case of aggressive release agents since no heating installations come into contact with the release agent per se.

In a refinement of the invention, means for monitoring a filling level in a storage container for a first component of the release agent are provided.

In a refinement of the invention, means for monitoring a flow and/or a flow quantity of the first component in a supply line to the proportional metering pump are provided.

In a refinement of the invention, means for monitoring a filling level of the intermediate tank having a mixed release agent are provided.

In that a plurality of filling levels and also the presence of a flow and a quantity of flow are monitored, for example, and this data is collected in a central controller, it can be ensured that no release agent or any release agent having a wrong concentration or composition is inadvertently present during the operation of the device. Should no release agent or a release agent with an erroneous composition actually be present, the device for pastillating can be rapidly switched off in order to prevent an erroneous production of pastilles.

In a refinement of the invention, the proportional metering pump is configured such that the latter is driven by means of the fluid pressure of a component of the release agent.

When a component of the release agent is water, for example, the proportional metering pump can then be driven by means of the water pressure. Except for the water pressure there is thus no external force of any kind required in order for the release agent to be continuously mixed. This significantly simplifies the design of the construction. Prior to being supplied to the proportional metering pump, the water is advantageously filtered in order to ensure that the completely mixed release agent does not contain any particles or other contaminants.

The issue on which the invention is based is also solved by a method for pastillating a flowable product, in which a liquid release agent is used between a belt and product drops that are deposited on the belt, and in which producing the liquid release agent is performed by continuously mixing at least two components of the release agent by way of a proportional metering pump, wherein a quantity of the first component of the release agent that is supplied to the proportional metering pump is determined so as to depend on a quantity of the second component that is conveyed through the proportional metering pump.

Apart from the advantages that have already been outlined in the context of the device according to the invention, the method according to the invention and especially the use of a proportional metering pump furthermore have the advantage that the concentration or composition, respectively, of the release agent is independent of variations in a supply pressure of the proportional metering pump. For example, when the release agent is mixed from a concentrate and water the proportional metering pump provides a consistent composition of the release agent even in the case of a variable water pressure.

In a refinement of the invention, monitoring and setting a temperature of the first component and/or of the second component of the release agent is provided at least in the region of the proportional metering pump.

In a refinement of the invention, heating and/or cooling of the first component of the release agent, of the second component of the release agent, and/or of the proportional metering pump is provided.

In a refinement of the invention, disposing a storage container for at least one component of the release agent and of the proportional metering pump in a common housing, and monitoring and setting a temperature in the housing are provided.

Further features and advantages of the invention are derived from the claims and from the following description of preferred embodiments of the invention in conjunction with the drawings. Individual features of the various embodiments in the various drawings herein can be combined with one another in any arbitrary manner without departing from the scope of the invention.

DETAILED DESCRIPTION

Figure 1:
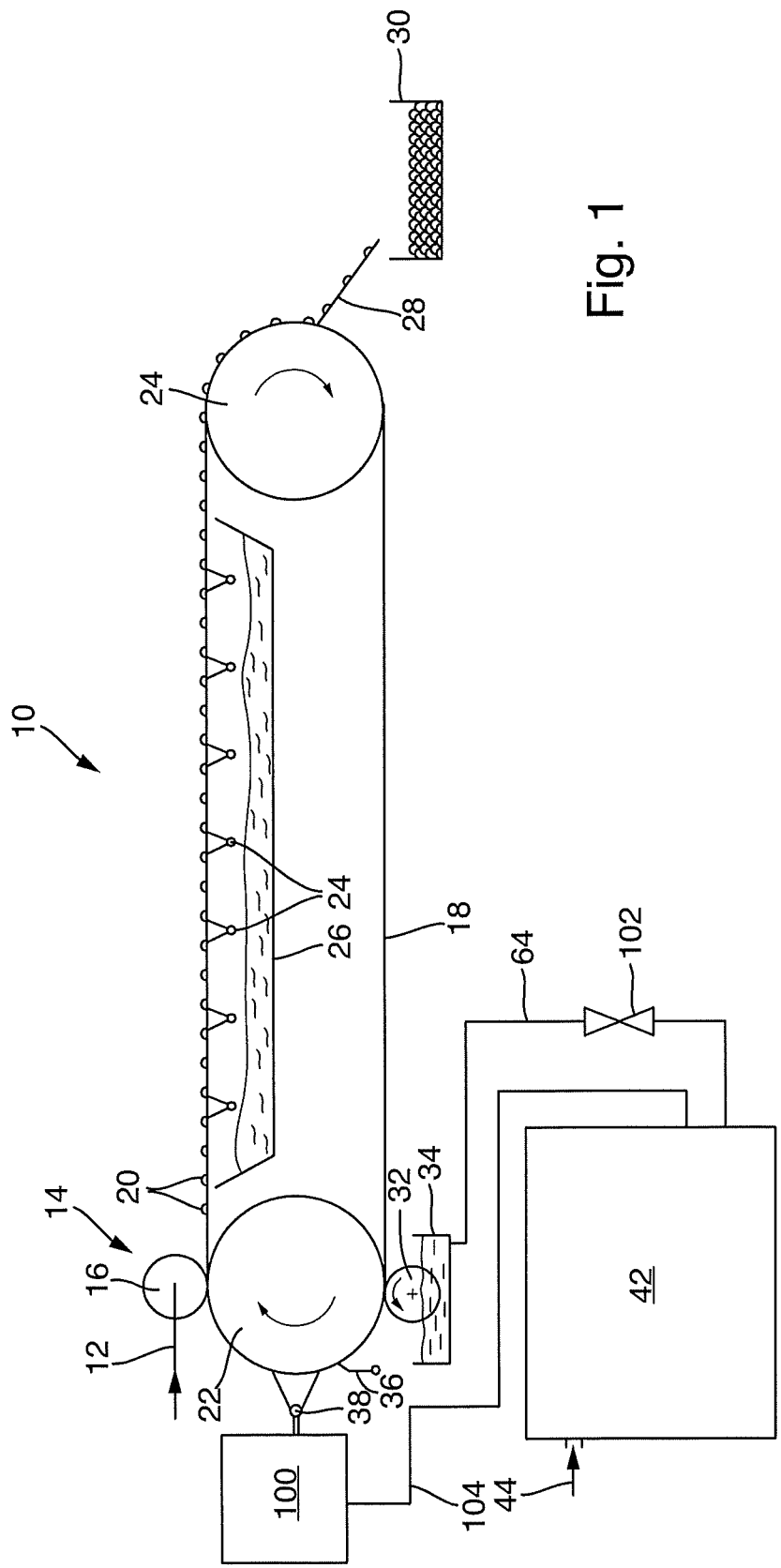
FIG. 1 shows a device according to the invention for pastillating a flowable product in a schematic side view.

FIG. 1, in a schematic manner and in a side view, shows a device 10 according to the invention for pastillating a flowable product, for example a sulfuric melt, in other words, molten sulfur. The sulfuric melt by way of a line 12 is supplied to a drop former 14 which has a rotating perforated external drum 16. The sulfuric melt is squeezed through the rotating perforated external drum by means of a nozzle bar that is disposed within the external drum. The external drum 16 is disposed above a revolving belt, in particular a steel belt 18, on account thereof depositing individual product drops 20 on the upper run of this steel belt. The steel belt 18 revolves about two drums 22 and 24. On account thereof, the product drops 20 that are deposited by the drop former 14 on the upper run of the steel belt 18 are moved to the right in the illustration of FIG. 1. The steel belt 18 is cooled from below by means of spray nozzles 24, wherein the cooling liquid drips down from the lower side of the steel belt 18 into a collection container 26, from where said cooling liquid can be supplied back to the spray nozzles 24 again. The product drops 20 in the course of transportation from the deflection drum 22 (disposed to the left in FIG. 1) to the deflection drum 24 (disposed to the right in FIG. 1) solidify to form pastilles. The solidified pastilles by means of a take-off blade 28 which in the region of the deflection by means of the deflection drum 24 bears on the steel belt 18 are removed in the region of the right-hand deflection drum 24 and then make their way into a collection container 30. The collection container 30 is disposed below the lower-lying end of the take-off blade 28 such that the pastilles can slide from the take-off blade 28 into the collection container 30.

When the pastilles are removed from the steel belt 18, the adhesion of the pastilles to the steel belt can be so strong that the pastilles at least partially break when no release agent is used between the product drops 20 and the steel belt 18. This leads to a formation of dust during the removal by means of the take-off blade 28. In order for such a strong adhesion of the product drops 20, or of the solidified pastilles, respectively, to the steel belt 18 to be prevented or at least reduced, the steel belt 18 prior to the deposition of the product drops 20 is wetted with a liquid release agent. Such a liquid release agent can be applied to the belt 18 by way of a roller 32, for example, said roller 32 contacting the revolving steel belt 18 and rolling thereon, on the one hand, and said roller 32 by way of part of the circumference thereof being submerged into a container 34 which contains the liquid release agent, on the other hand. A uniform layer thickness of the release agent can be ensured by at least one wiper 36 which is disposed downstream of the application roller 32.

The roller 32 is disposed below the deflection drum 22 (to the left in FIG. 1). The container 34 is located below the roller 32. The wiper 36 is disposed downstream of the roller 32, contacting the steel belt 18 in a region in which the latter bears on the deflection drum 22.

The container 34 which is filled with the liquid release agent and into which the roller 32 in portions is submerged is supplied with completely mixed liquid release agent from a device 42 by way of a line 64. A valve 102 by way of which the line 64 can be closed off is disposed in the line 64. On account thereof it can be avoided that release agent inadvertently runs into the container 34.

Alternatively or additionally, the release agent can also be applied by means of spray nozzles 38, which, in the illustration of FIG. 1 wet the steel belt 18 in that region in which the latter bears on the left-hand deflection drum 22. After the release agent has been sprayed by means of the spray nozzles 38, the region of the steel belt 18 having the release agent sprayed thereon still covers a distance which corresponds to approximately a quarter of the circumference of the left-hand deflection drum 22. The release agent during the dwell time or resting time on the steel belt 18 that is caused on account thereof can still bleed on the steel belt 18 and form a uniform thin layer on which the product drops 20 are then deposited by means of the drop former 14. The quantity of the liquid release agent that drips down from the steel belt 18 is minimal in the case of a suitable setting of the spray nozzles 38.

The spray nozzles 38 are supplied with the liquid release agent and compressed air by way of a pneumatic spraying installation 100, and said spray nozzles 38 can thus be constructed as two-component spray nozzles in order for a very fine atomization of the release agent to be achieved. The pneumatic spraying installation 100 is supplied with completely mixed release agent by means of a line 104 from the device 42.

The liquid release agent during the operation of the device 10 is produced continuously from at least two components by means of the device 42 that is illustrated only in a schematic manner in FIG. 1. Herein, one component of the release agent is water which according to an arrow 44 is supplied to the device 42 from a conventional water line. The device 42 operates by way of a proportional metering pump, the construction of the device 42 being explained in detail by means of FIG. 2.

Figure 2:
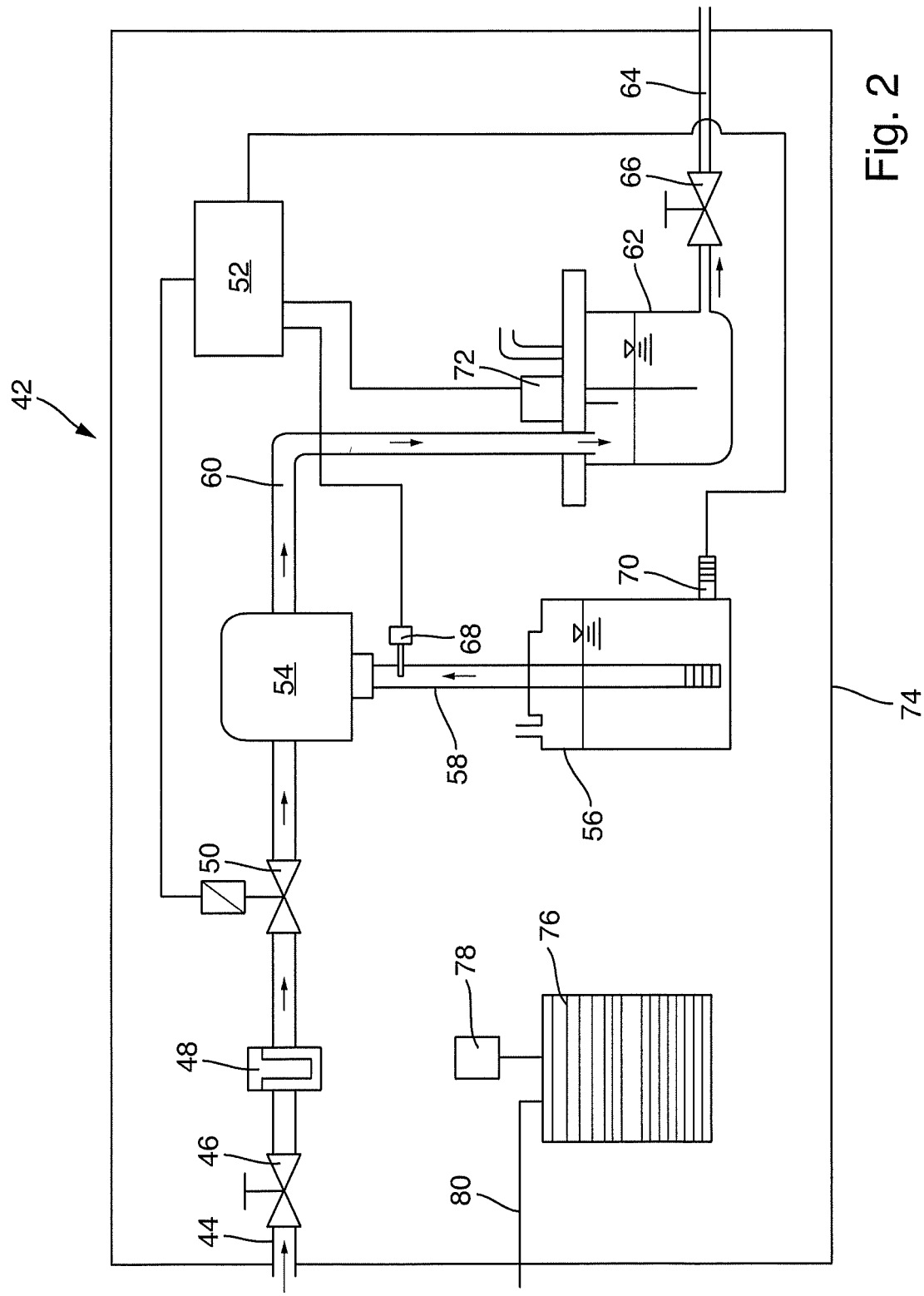
FIG. 2 shows a schematic illustration of the device of FIG. 1 for producing a release agent.

The device of FIG. 2 shows a schematic view of the device 42 for producing a release agent. As has already been discussed, the device 42 is connected to a water line and water is supplied as indicated by the arrow 44. The water flows through a conventional shut-off valve 46 and by way of a filter 48 and by way of a magnetic valve 50 which can be actuated by means of a central control unit 52 of the device 42. A proportional metering pump 54 is provided downstream of the magnetic valve 50. The proportional metering pump 54 operates according to the principle of a water jet pump, for example, and is driven by the pressure of the water supplied. By means of the proportional metering pump 54 a second component of the release agent, a concentrate, is suctioned from a supply tank 56 by way of a line 58. A mixing ratio between the water and the concentrate from the tank 56 herein can be set at the proportional metering pump 54. The completely mixed release agent in the desired concentration, or in the desired composition, respectively, is then available downstream of the proportional metering pump 54 in a line 60. The line 60 leads to an intermediate tank 62 in which the completely mixed release agent is intermediately stored. Proceeding from the intermediate tank 62, the release agent by way of the line 64 is then supplied to the container 34 or to the spray nozzles 38 via the line 104 (see FIG. 1). The line 64 can be closed off and released by means of a shut-off valve 66.

The intermediate tank 62 herein has a holding capacity which is comparatively small and in any case smaller than a quantity of release agent which is required in four operating hours of the device 10. The intermediate tank 62 serves inter alia for bridging a period in which the container 56 having the concentrate of the release agent is filled or changed, for example, or for bridging a period in which the filter 48 is cleaned and/or other components of the device 42 are serviced, for example. However, the intermediate tank 62 primarily serves as a buffer when a plurality of devices 10, that is to say steel belt coolers, are activated or deactivated. The intermediate tank 62 has a volume between 6 and 7 liters, for example. The tank 56 for the concentrate has a volume of 40 liters, for example.

In order to ensure that release agent in the desired composition is available in the line 64 at all times during the operation of the device 10 (see FIG. 1), the central controller 52 by means of a sensor 68 which is disposed in the line 58 between the container 56 and the proportional metering pump monitors the presence of a flow and a flow quantity in the supply line 58 from the container 56 to the proportional measuring pump 54. A further capacitive sensor 70 which is disposed directly above a base of the container 56 acquires the filling level of the tank 56 through the wall of the latter and emits a signal to the central control 52 when a filling level in the container 56 lies below a predefined value, that is to say when the container 56 requires refilling. The central controller 52 by means of two filling level sensors 72 moreover monitors the filling level of the intermediate tank 62 and controls the inlet valve 50 for refilling the intermediate tank 62. The filling level sensors 72 in the intermediate tank 62 are disposed level with a maximum fluid level, or level with a minimum fluid level, respectively. The maximum fluid level by way of the arrangement of a first one of the sensors 72 is determined such that the intermediate tank 62 does not overflow. The minimum fluid level by way of the arrangement of a second one of the sensors is determined such that said minimum fluid level is disposed so as be at a short spacing above the base of the intermediate tank 62. It is ensured by means of the second sensor 72 that the line 64 does not run dry.

If the central controller 52 by means of the sensor 70 detects that the container 56 is almost empty and requires refilling, for example, the central controller 52 emits a signal for the container 56 to be refilled. Should this refilling procedure not be performed within a predefined period of in particular one hour from the time of the signal emission, the central controller 52 stops the device 10 for pastillating. Any further retrieval of release agent by means of the spraying installation 100 and of the spray nozzles 38 is thus prevented. By stopping the device 10 for pastillating it can be guaranteed that release agent is always applied and the intermediate tank 62 is filled with completely mixed release agent at all times. After refilling of the container 56, the central controller 52 by way of the sensor 70 detects the now sufficient filling level and thus provides the clearance for restarting the device 10 for pastillating.

During the predefined period of in particular one hour from the time of the signal emission, the device 10 in the meantime is provided with completely mixed release agent from the intermediate tank 62. Once the container 56 has been refilled, the central controller 52 detects this by way of the signal of the sensor 70.

The proportional metering pump 54 is driven by means of the water pressure, thus not requiring a motorized drive of any type itself.

The device 42 for continuously producing the release agent is disposed within a housing 74, for example a cabinet. Temperature control means in the form of a heater 76 and of a thermostat 78 are provided within the housing 74. The heater 76 is provided with electrical power by way of a line 80. The thermostat 78 acquires a temperature in the housing 74 and accordingly actuates the heater 76. On account thereof, a consistent temperature can be guaranteed within the housing 74. This is advantageous in particular since the release agent that is used for pastillating a sulfuric melt displays a viscosity that is dependent on temperature. In that a consistent temperature thus prevails within the housing 74, the proportional metering pump 54 and the container 56 having the concentrate of the release agent that is contained therein are temperature controlled. On account thereof, a mixing ratio in the proportional metering pump 54 can be maintained within an extremely narrow tolerance range.

The thermostat 78 in the embodiment illustrated is not connected to the central controller 52. However, it can be readily provided in the scope of the invention that the central controller 52 by means of the thermostat 78 monitors the temperature within the housing 74 and, for example in the case of a failure of the heater 76, stops the device 10 for pastillating so as to prevent the belt 18 being sprayed with an erroneously mixed release agent.

The invention claimed is:

1. A device for pastillating a flowable product, said device having a revolving belt and a drop former, the drop former depositing flowable product drops on an upper run of the belt, the product drops in the course of transportation on the upper run of the belt solidifying to form pastilles, the device further including an arrangement for wetting the belt with a liquid release agent disposed upstream of a region in which the product drops are deposited on the belt, the release agent preventing or reducing adhesion of the product drops to the belt, and a proportional metering pump for continuously mixing the release agent formed from at least two liquid components during operation of the device, the proportional metering pump setting a mixing ratio between the at least two liquid components and outputting a completely mixed release agent in a desired concentration or in a desired composition via a single line disposed downstream of the proportional metering pump.

2. The device as claimed in claim 1, further including an intermediate tank for intermediately storing the completely mixed release agent prior to application thereof to the belt.

3. The device as claimed in claim 2, wherein a holding capacity of the intermediate tank is smaller than a quantity of release agent that is required in four operating hours of the device.

4. The device as claimed in claim 1, wherein the at least two liquid components of the completely mixed release agent form a dispersion.

5. The device as claimed in claim 1, further including a temperature controlling arrangement configured to control a temperature of at least one of the two liquid components.

6. The device as claimed in claim 1, further including a storage container for one of the two liquid components and a housing, the proportional metering pump and the storage container both being disposed in the housing, the device further including a temperature control arrangement for maintaining a temperature within the housing in a predefined range.

7. The device as claimed in claim 1, further including a storage container for one of the two liquid components and an arrangement for monitoring a fill level in the storage container.

8. The device as claimed in claim 1, further including a supply line connected to the proportional metering pump and to a supply of one of the two liquid components, and an arrangement for monitoring a flow and/or a flow quantity of the one liquid component in the supply line.

9. The device as claimed in claim 1, wherein the proportional metering pump is configured such that same is driven by a fluid pressure of a one of the two liquid components.

10. The device as claimed in claim 1, wherein the proportional metering pump has an output fluidly connected to the single line such that the single line receives the completely mixed release agent from the proportional metering pump, and two inputs disposed to respectively receive the two liquid components, the proportional metering pump being configured to output the completely mixed release agent via the output to the single line.

11. The device as claimed in claim 10, further including an intermediate tank disposed downstream, with respect to a flow direction through the proportional metering pump, of the proportional metering pump, the single line having an upstream end connected the output of the proportional metering pump and a downstream end connected to the intermediate tank to fluidly connect the proportional metering pump and the intermediate tank to one another such that the intermediate tank receives the completely mixed release agent from the proportional metering pump, the intermediate tank being configured to store the completely mixed release agent received from the metering pump.

12. The device as claimed in claim 11, wherein the intermediate tank is fluidly interconnected to the wetting arrangement to supply same with the completely mixed release agent.

13. A device for pastillating a flowable product, said device comprising:
a revolving belt having an upper run and a lower run;
a drop former configured and disposed to deposit flowable product drops on said upper run of said belt at a deposit region, said upper run being disposed to transport the product drops away from said drop former along a transportation path on which the product drops solidify;
an arrangement for wetting said belt with a liquid release agent to prevent or reduce adhesion of the product drops to said belt, said wetting arrangement being disposed upstream, with respect to a direction of movement of said belt, of said deposit region;
a proportional metering pump, said metering pump having an output and two inputs disposed to respectively receive two liquid components, said metering pump being configured to set a mixing ratio between the two liquid components and to continuously mix the two liquid components during operation of said device to form a completely mixed liquid release agent having a desired concentration or a desired composition; and
a single line disposed downstream, with respect to a flow direction through said metering pump, of said metering pump, said single line being connected to said output of said metering pump such that said single line receives the completely mixed liquid release agent from said metering pump.

14. The device as claimed in claim 13, further including a storage container in which one of the two liquid components is stored and a housing, said metering pump and said storage container both being disposed in said housing, said device further including a temperature control arrangement configured to maintain a temperature within said housing within a predefined range.

15. The device as claimed in claim 2, including an arrangement for monitoring a fill level of the intermediate tank storing the completely mixed release agent.

16. The device as claimed in claim 13, further including a storage container in which one of the two liquid components is stored, a supply line fluidly interconnecting said storage container to one of said inputs of said metering pump, and a sensor configured to monitor a fill level of the one liquid component stored in said storage container.

17. The device as claimed in claim 16, wherein said sensor is a first sensor and said device further includes a second sensor disposed in said supply line and configured to monitor a flow of the one liquid component in said supply line.

18. The device as claimed in claim 13, wherein said metering pump is configured for being driven by a fluid pressure of one of the liquid components.

19. The device as claimed in claim 13, further including an intermediate tank disposed downstream, with respect to the flow direction through said metering pump, of said metering pump, said single line having an upstream end connected said output of said metering pump and a downstream end connected to said intermediate tank to fluidly connect said metering pump and said intermediate tank to one another such that said intermediate tank receives the completely mixed liquid release agent from said metering pump, said intermediate tank being configured to store the completely mixed liquid release agent received from said metering pump.

20. The device as claimed in claim 19, wherein said intermediate tank is fluidly interconnected to said wetting arrangement to supply same with the completely mixed liquid release agent.

\* \* \* \* \*